United States Patent [19]
Bigelow et al.

[11] Patent Number: 5,193,759
[45] Date of Patent: Mar. 16, 1993

[54] FILM OR PAPER CASSETTE

[75] Inventors: Donald O. Bigelow, Webster; Craig A. Caprio, Rochester; John B. Chemelli, Webster, all of N.Y.

[73] Assignee: Eastman Kodak Company, Rochester, N.Y.

[21] Appl. No.: 633,506

[22] Filed: Dec. 28, 1990

[51] Int. Cl.$^5$ .................. B65H 16/06; G03B 1/02
[52] U.S. Cl. .................. 242/71.1; 206/404; 354/275
[58] Field of Search .......... 242/71.1, 55.53, 71.7; 206/397, 403–406, 408, 409, 389, 53–55, 407, 411–417; 354/275; 355/72

[56] References Cited

U.S. PATENT DOCUMENTS

| | | | |
|---|---|---|---|
| 2,072,625 | 3/1937 | Rose | 242/71.1 |
| 2,194,603 | 3/1940 | Lingg et al. | |
| 2,798,597 | 7/1957 | Thompson | 242/55.53 |
| 3,104,846 | 9/1963 | Ringle | 242/71.1 |
| 3,198,418 | 8/1965 | Rupp | 229/40 |
| 3,568,587 | 3/1971 | Laval | |
| 3,641,910 | 2/1972 | Smith | |
| 3,691,921 | 9/1972 | Isbell | |
| 3,791,601 | 2/1974 | Broden | 242/55.53 |
| 4,221,479 | 9/1980 | Harvey | 354/275 |
| 4,239,164 | 12/1980 | Barnsbee et al. | 242/55.53 |
| 4,298,276 | 11/1981 | Tsuda et al. | 355/72 |
| 4,363,548 | 12/1982 | Oberhoffner | 354/298 |
| 4,420,120 | 12/1983 | Raymond | 242/71.7 |
| 4,743,928 | 5/1988 | Young | 354/310 |
| 4,854,519 | 8/1989 | Maeda et al. | 242/71.1 |
| 4,874,089 | 10/1989 | Matsuda et al. | 206/397 |
| 4,889,292 | 12/1989 | Loewe et al. | 242/71.1 |
| 4,948,063 | 8/1990 | Niedospial | 242/71.1 |
| 4,984,016 | 1/1991 | Makino et al. | 355/72 |
| 5,046,677 | 9/1991 | Loewe et al. | 242/55.53 |
| 5,104,054 | 4/1992 | Latham | 242/55.53 |

Primary Examiner—John M. Jillions
Attorney, Agent, or Firm—Charles E. Snee, III

[57] ABSTRACT

A two part clamshell web cassette is provided with a central recess for receiving a web roll core. The core and cassette half shells have mating surfaces which form a labyrinth light seal when the cassette is closed and which prevent rotation of the core during handling of the cassette to provide a core brake. Surfaces on the cassette parts clamp the web tail of a partially dispensed web roll when the cassette is closed. The core brake and web clamping surfaces facilitate transport of the cassette without loss of intra-roll web tension. The cassette is provided with a latch for retaining the cassette half shells in a closed light sealed condition. A frangible covering over a latch release means indicates when broken that the cassette may have been opened prematurely. The cassette further includes a web end retaining means which retains the web end portion to the underlying convolution. The cassette further includes an orientation of light blocking surfaces on each half shell which permits the half shells to be identically molded and then rotated 180 degrees during assembly to cause the light blocking surfaces to mate.

22 Claims, 10 Drawing Sheets

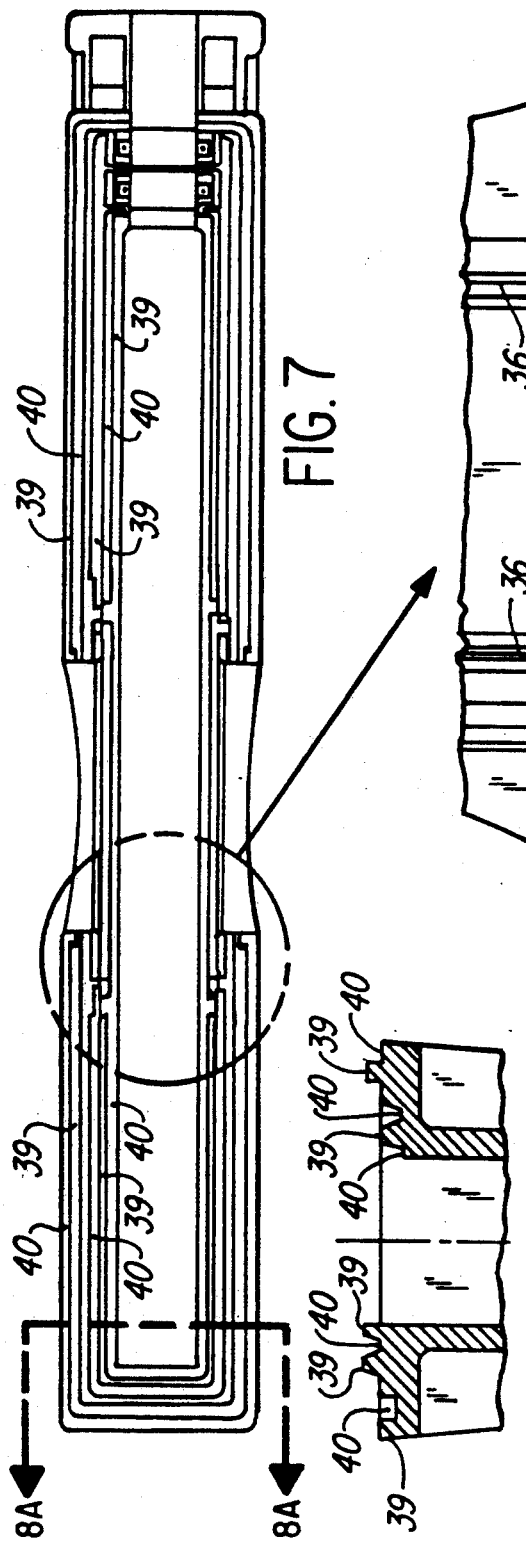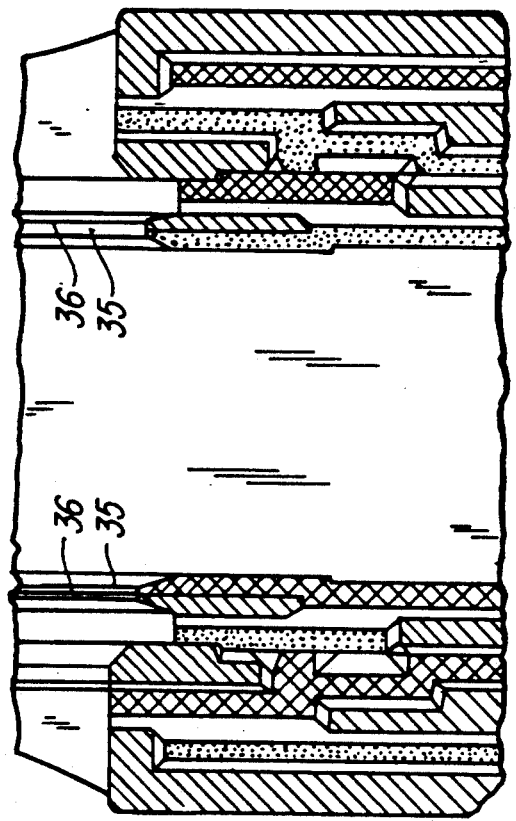

FILM OR PAPER CASSETTE

CROSS REFERENCE TO RELATED APPLICATIONS

Reference is made to the following commonly assigned U.S. Applications:
1. Ser. No. 07/633,522 entitled "Film Handling System" and filed in the names of Lyndon R. Huttemann, Michael Long, and Robert W. Sanford, and
2. Ser. No. 07/633,508 entitled "Cassette Opening System" filed in the names of Donald O. Bigelow, Craig A. Caprio, and John B. Chemelli.

TECHNICAL FIELD

This invention relates to film cassettes and, more particularly, to an improved cassette for storing and dispensing light sensitive material such as photographic film or paper.

BACKGROUND ART

In film and paper finishing operations, it is desirable to eliminate the need for operations personnel to work in darkroom conditions. It is also desirable to automate the film or paper handling system to relieve operations personnel of routine manual labor and allow them to perform more important higher level functions.

It is known to use light proof cassettes for photographic film and paper handling. However, such cassettes generally require manual opening and removal of the film.

Also, such cassettes typically permit movement of a film or paper roll during handling of a cassette with automatic equipment and do not provide for closure and such handling of a cassette with a partially dispensed film roll. Moreover, the light sealing features of such cassettes are sometimes inadequate, resulting in light damage to the film.

DISCLOSURE OF THE INVENTION

In accordance with the invention, a clamshell web cassette is provided with a central recess which receives a web roll core. The core and cassette have mating surfaces which form a labyrinth light seal when the cassette is closed and prevent rotation of the core during handling of the cassette to provide a "core brake." Means on the cassette parts are provided to clamp the web tail of a partially dispensed web roll when the cassette is closed. This core clamping means and web clamping means facilitates transport of the cassette without loss of inter-roll web tension.

Another feature of the cassette is a unique latch for retaining the half shells in a closed light sealed condition. A frangible covering over a latch release means indicates when broken that the cassette may have been opened prematurely to damage the film through exposure to light.

Another feature of the cassette is the provision of unique light blocking surfaces which block light in both longitudinal and transverse directions relative to the film path.

Another feature of the cassette is a web end retaining means which retains the web end portion to the underlying convolution of the web roll but yet allows automatic pickup of the end portion. This feature, in combination with the core brake, enables the cassette to be transported with a full roll with minimal risk of roll movement or clockspringing.

Still another feature of the cassette is a unique orientation of light blocking surfaces on each half shell which permit the halves to be identically molded and then rotated 180 degrees during assembly to cause the light blocking surfaces to mate.

BRIEF DESCRIPTION OF THE DRAWINGS

Other advantages and features will become apparent from the following description taken in connection with the following drawings wherein:

FIG. 7 is an end view of one of the cassette halves showing the light sealing means;
FIG. 8 is an enlarged view showing that portion of the light sealing means designated by the dashed circle in FIG. 7;
FIG. 8a is a section taken along the lines of 8A of FIG. 7.

MODE OF CARRYING OUT THE INVENTION

Figure 1:
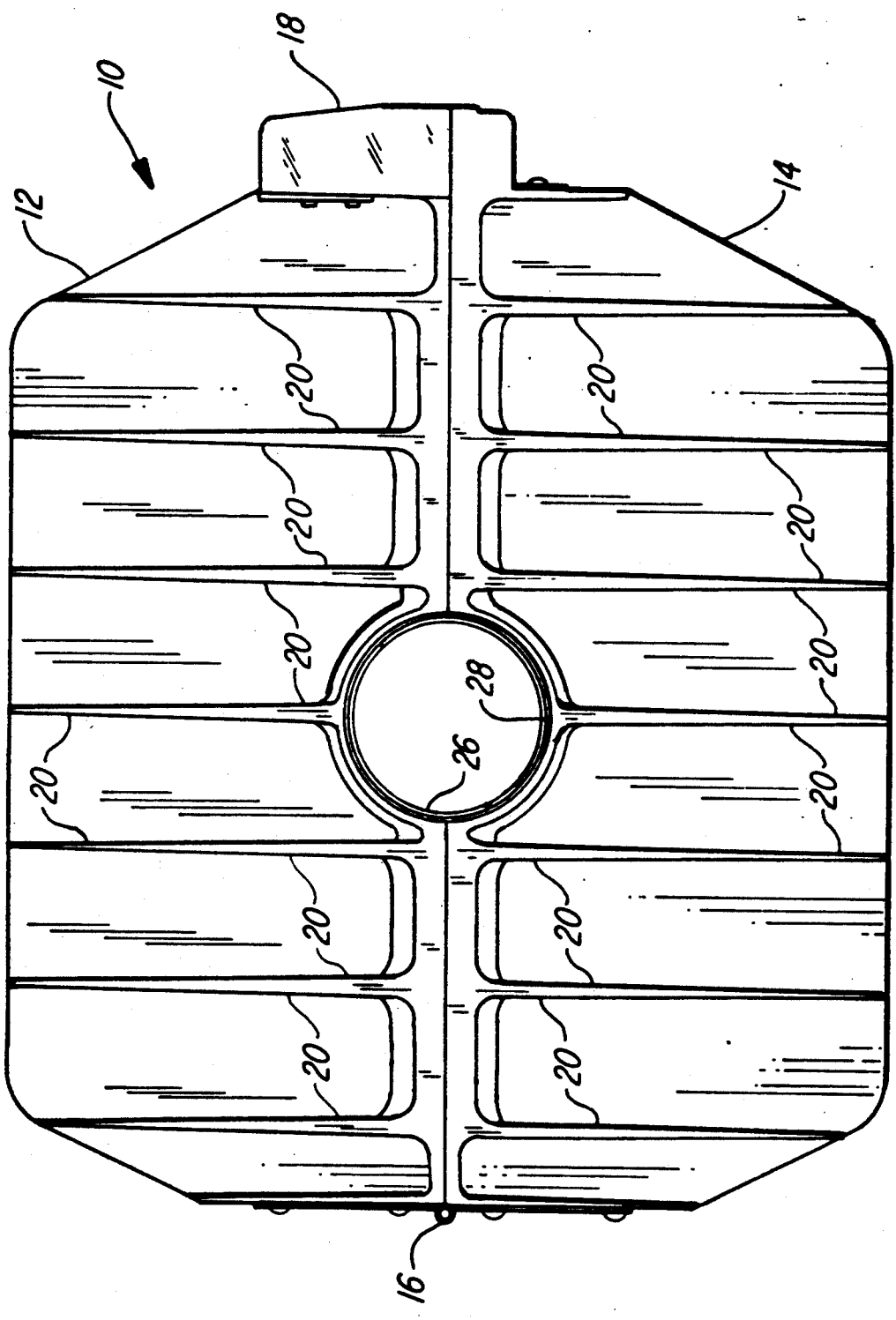
FIG. 1 is a side view of a film cassette in accordance with the invention.

Referring to the drawings, there is shown a clam shell cassette 10 having two half shells 12 and 14, which are identical parts coupled together at one end by a hinge 16 and adapted to be releasibly coupled at the other end by a latch means 18. Each half shell is preferably molded from plastic material and provided with a plurality of reinforcing ribs 20 on its exterior surface.

Figure 2:
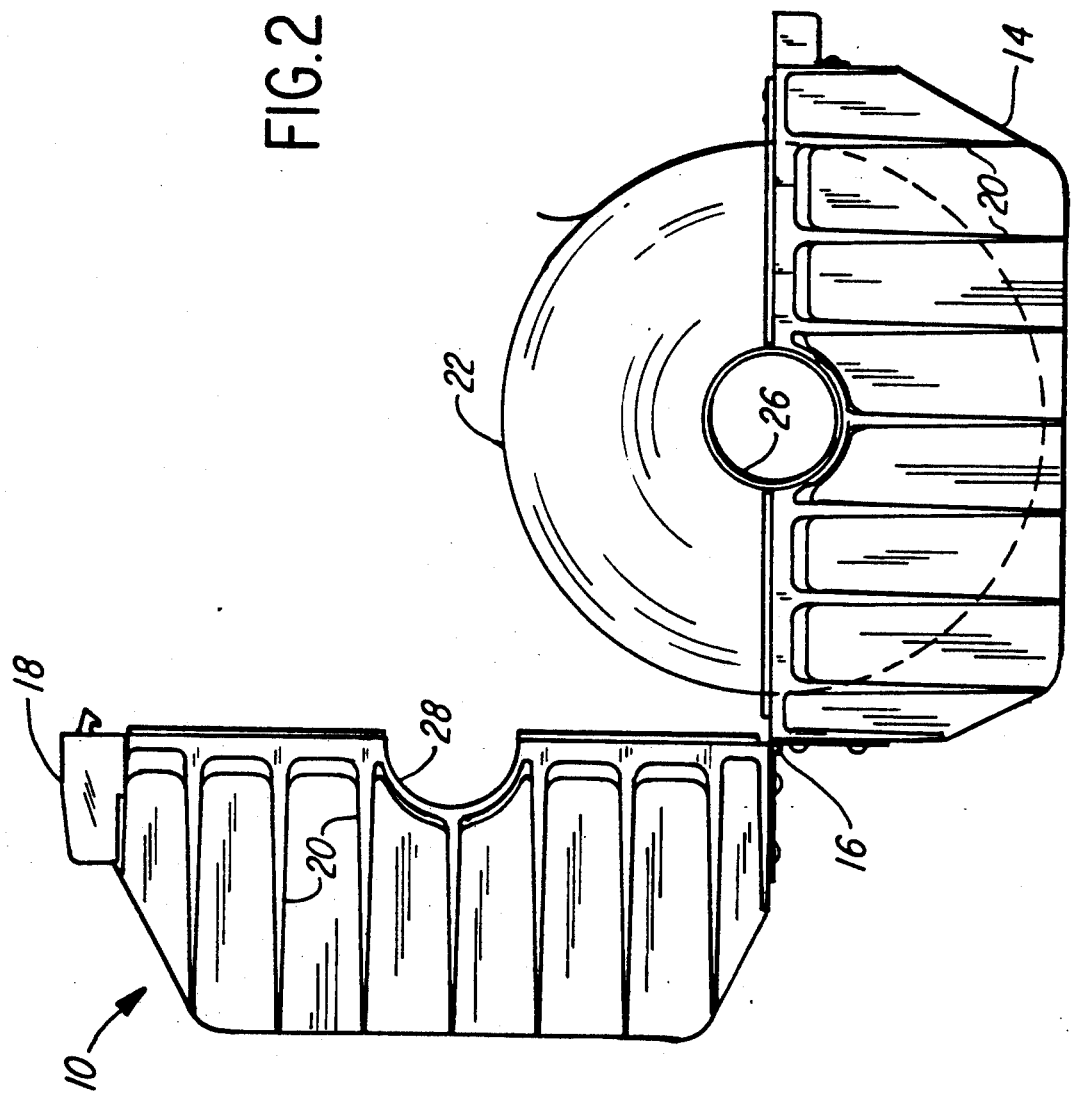
FIG. 2 is a side view similar to FIG. 1 showing the cassette open.
Figure 3:
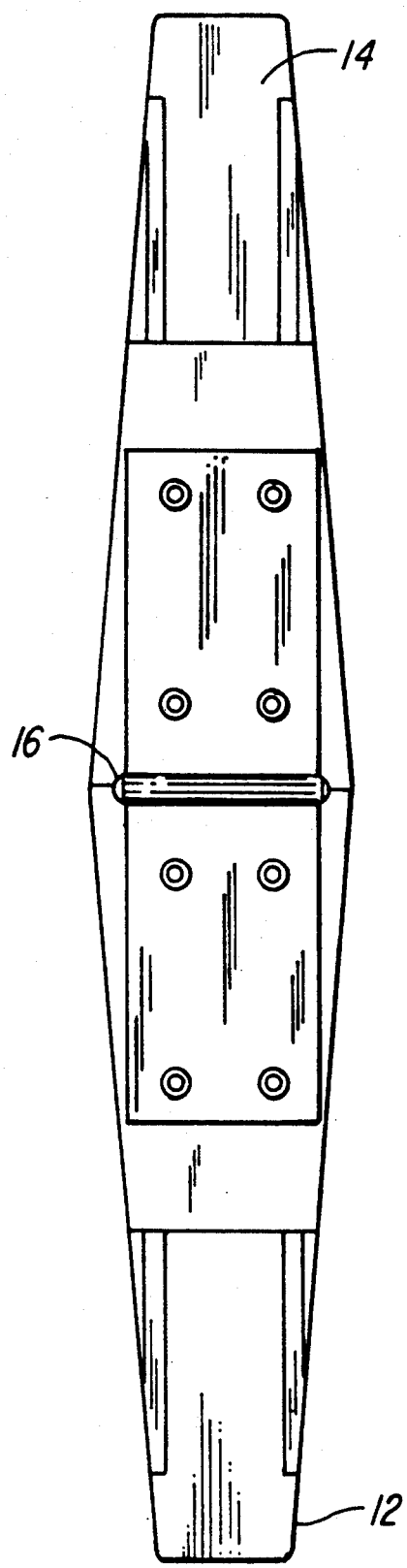
FIGS. 3 and 4 are opposite end views of the cassette shown in FIG. 1.
Figure 4:
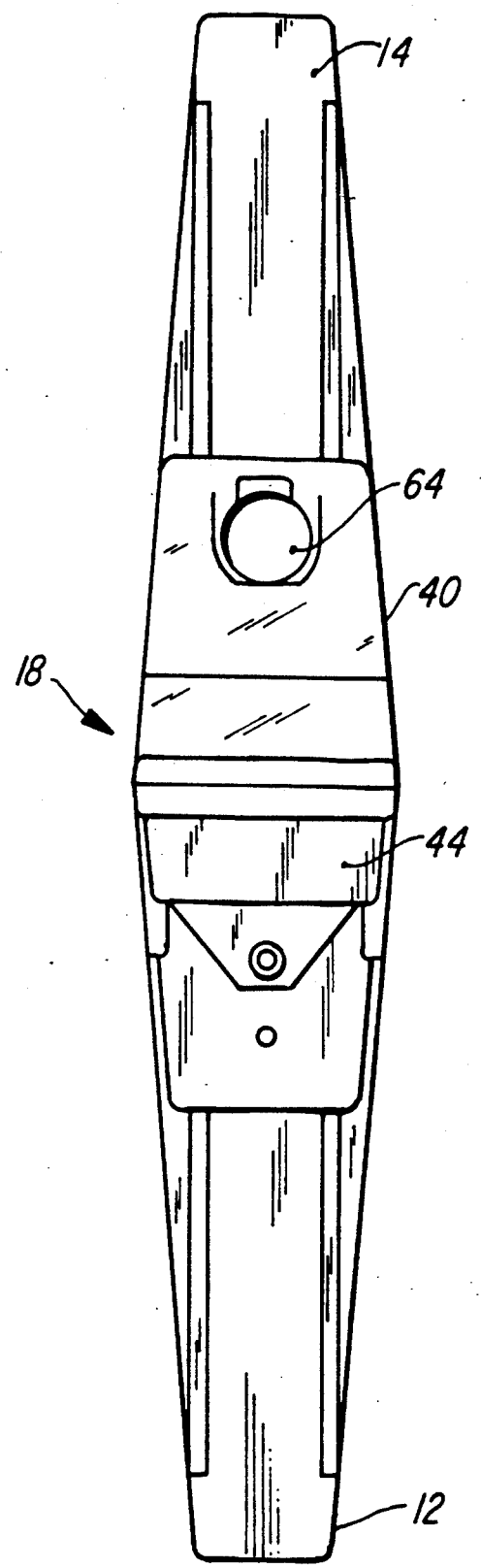

As shown in FIG. 2, the cassette 10 is adapted to receive a roll 22 of light sensitive material such as photographic film or paper. In a preferred application of the cassette stock rolls of photographic film are stored in such cassettes and transported in the cassettes to finishing stations where the film is removed for finishing and subsequent spooling into camera film rolls. Apparatus for opening and removing film from such a cassette is disclosed and claimed in copending application Ser. No. 07/633,522 cross referenced above and incorporated herein by reference.

Figure 13:
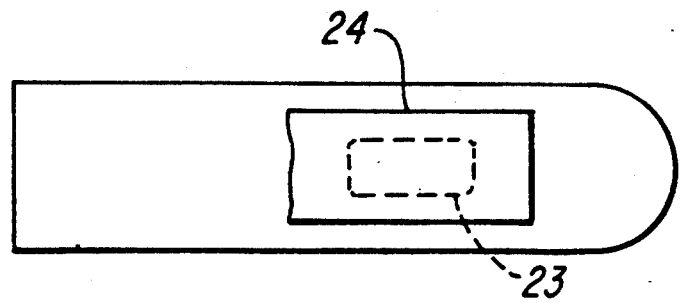
FIG. 13 is a top view of the film end portion illustrating the film end retaining means.

To prevent clockspring of the convolutions of the roll 22 during transport of the cassette, the leading portion is provided with a rectangular opening 23 (FIG. 13). A rectangular strip 24 of adhesive material having dimensions larger than opening 23 is attached to the outer convolution to cover the opening 23 and the adjacent portions of the outer convolution. The strip 24 adheres to both the outer convolution and the underlying convolution through the opening 23 to thereby retain the outer convolution to the roll with the very end of the leader free to be picked up by automatic equipment.

Figure 10:
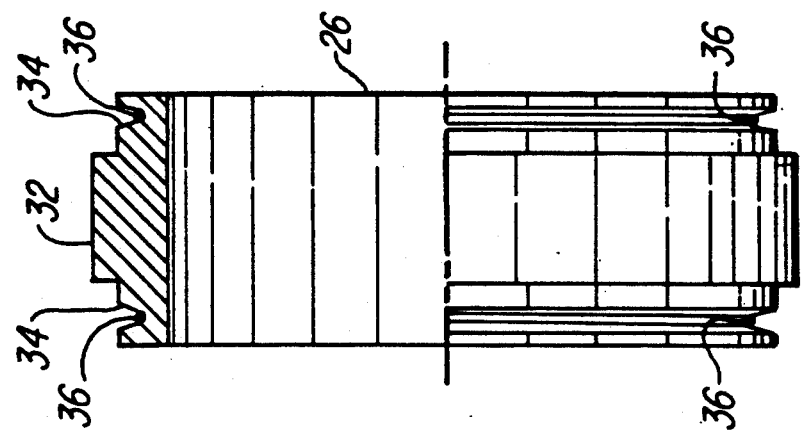
FIG. 10 is an end view of the film roll core shown in FIG. 9 in partial section taken along line 10—10 of FIG. 9.
Figure 9:
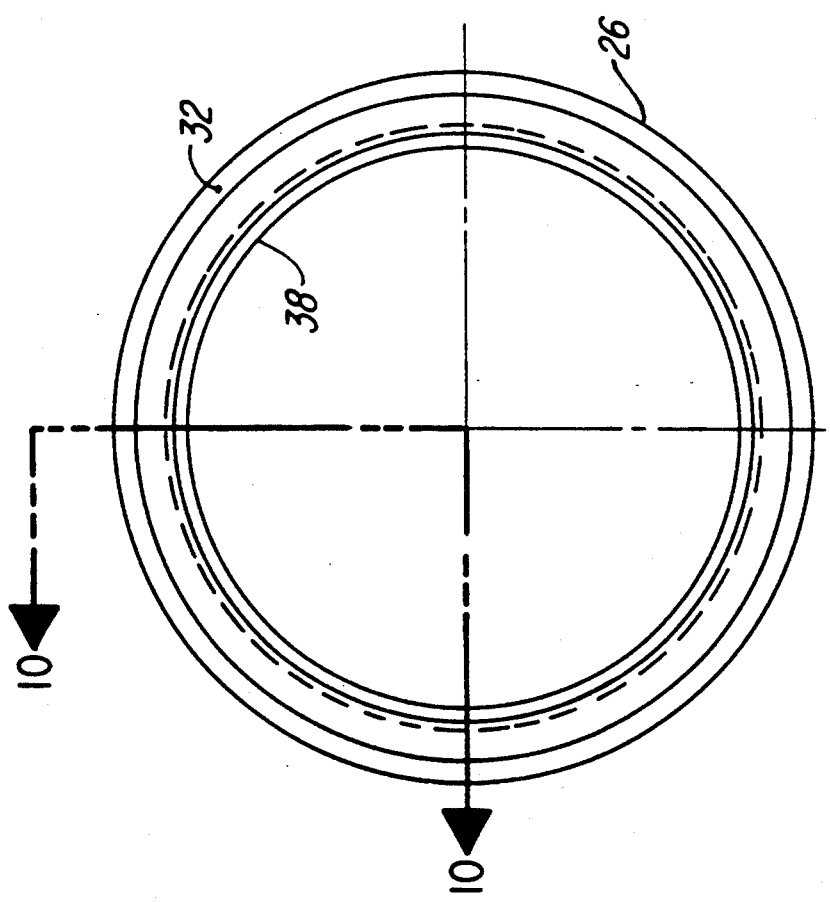
FIG. 9 is a side view of the film roll core.
Figure 11:
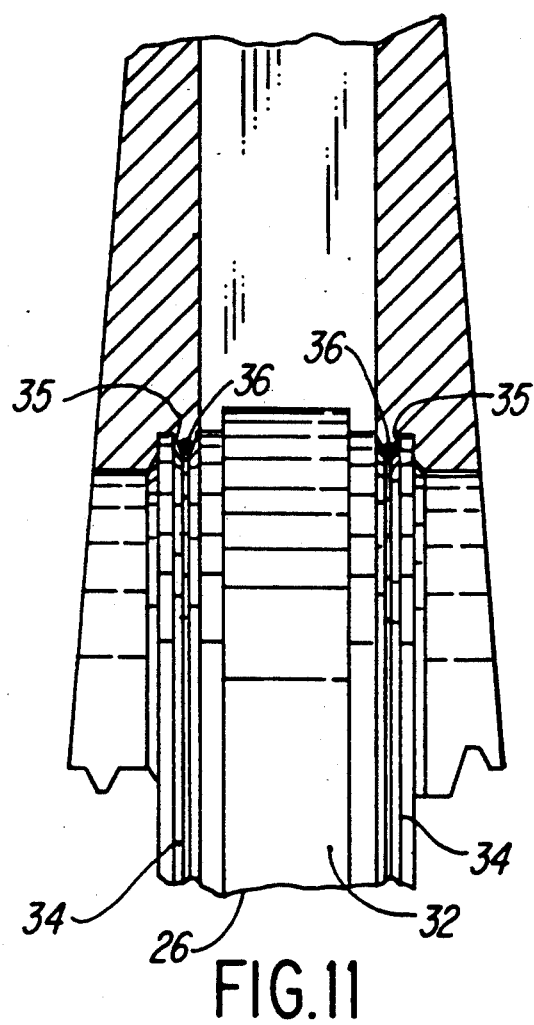
FIG. 11 is an enlarged view of a portion of the cassette and film core illustrating the mating light sealing surfaces of the cassette and film roll core.

The cassette 10 is provided with a removable circular core 26 for supporting the roll 22. The core 26 is adapted to be received in a central opening 28 formed by aligned semicircular recesses in the clam shell halves 12 and 14. As shown in FIGS. 9 and 10, the core 26 is provided with a peripheral surface 32 on which the film roll is wound. On each side of the roll receiving surface 32 is an annular recess 34. When the cassette is closed, each recess 34 engages a complemental rib 35 in the clam shell halves to form an effective labyrinth light seal between the core 26 and clam shell halves. The cassette is designed to disengage completely from the core during feeding of film as disclosed in copending application Ser. No. 076/33,522. This eliminates the need for dirt generating cassette/core bearing surfaces at the cassette core interface and eliminates the need for light locking exit rollers which may contact and damage the film.

Preferably, the end of the film roll is cinched to the core to allow the film to be fully removed from the core with automatic equipment.

The base of each recess 34 is sized to provide space for the inclusion of a ring 36 (FIG. 10) of compliant material. This material provides a slight interference fit between the core and closed cassette and thus provides a "core brake" which prevents rotation of the core and stockroll during transport.

Figure 14:
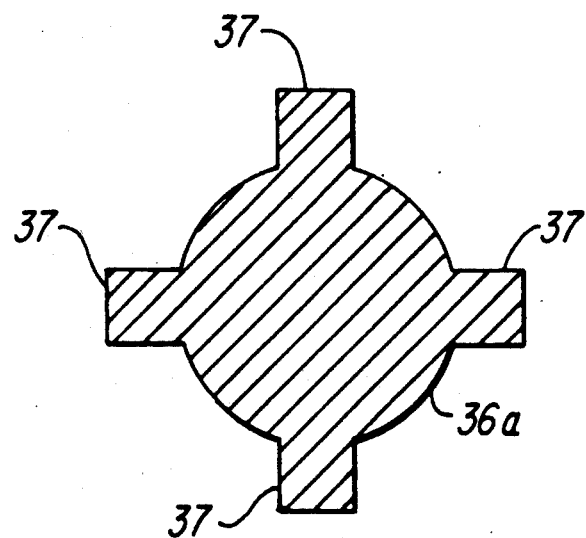
FIG. 14 is a cross section of another embodiment of the core clamping ring.

The ring 36 may comprise a simple O-ring having a circular cross section. Preferably, however, it will take the form shown in FIG. 14 and have a generally circular cross section provided with four integral longitudinal extensions on wings 37 equally radially spaced around the periphery of the circular center portion. The wings 37 enhance the braking and light sealing action of the ring.

The core 26 is provided with a central bore 38 adapted to receive an expandable shaft (not shown) for supporting and driving the film roll. Preferably, the internal bore of the core is of large diameter to facilitate easy loading and unloading with automatic equipment. When the cassette is open, the core will be free of the clam shell halves and the roll can be rotated by the shaft. Such operation is more fully disclosed in copending application Ser. No. 07/633,522 cross-referenced above and incorporated herein by reference.

As will be apparent from FIGS. 1-4 and FIGS. 7, 8 and 8a, the clam shell halves 12 and 14 have elongated ribs 39 and recesses 40 on their interfacing surfaces along the longitudinal axis of said surfaces which define a first light blocking means for blocking light in a direction transverse to such longitudinal axis. As shown specifically in FIG. 8, the ribs and grooves have surfaces in the area adjacent to the central opening 28 which extend both transversely and longitudinally and vary in height in a pattern determined empirically to define a second light blocking means which blocks light in both longitudinal and transverse directions relative to the longitudinal axis of the mating surfaces of the clam shell halves adjacent the central opening. The legend associated with FIG. 8 identifies the surfaces which are deeper and taller than a datum level. This orientation of such surfaces provides a complex labyrinth of light blocking surfaces which insure total blocking of ambient light. Further longitudinal light blocking is provided by the film clamping rolls described below.

Figure 15:
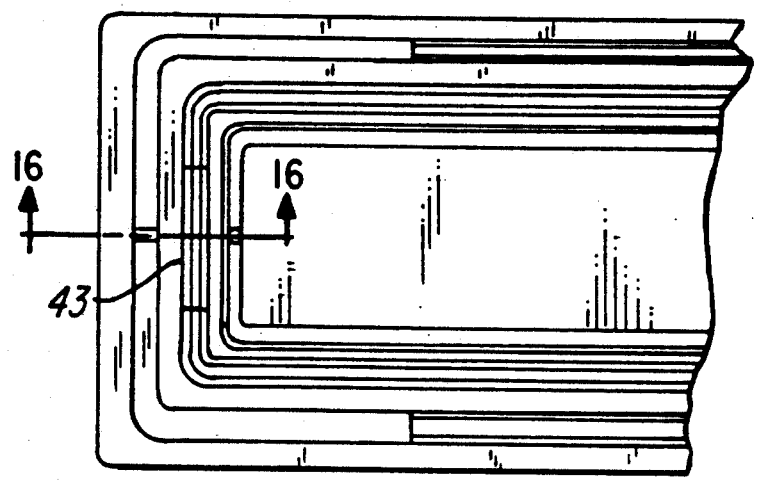
FIG. 15 is a detail showing a light locking member that is inserted in the hinge end of one of the clam shell halves during assembly.
Figure 16:
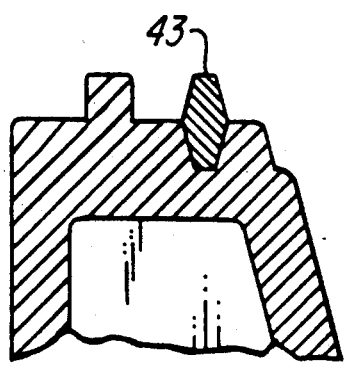
FIG. 16 is a section taken along the line 16—16 of FIG. 15.

The clam shell halves may comprise identical molded parts symmetrical along their longitudinal axis. The ribs and groove may be molded into the clam shell halves or attached after molding. Preferably, the parts are molded with the ribs and grooves integrally formed. To achieve mating of the identical half shell, the grooves in the upper portion of each clamshell half are axially aligned with the ribs in the lower portion. Because the clam shell halves are symmetrical along their longitudinal axis, two identical clam shell halves will mate when rotated 180 degrees and placed together. The only modification required after molding is the bonding of a small light blocking rib 43 (FIG. 15) in one of the half shells at the hinge end to prevent light from entering the hinge end.

Figure 5:
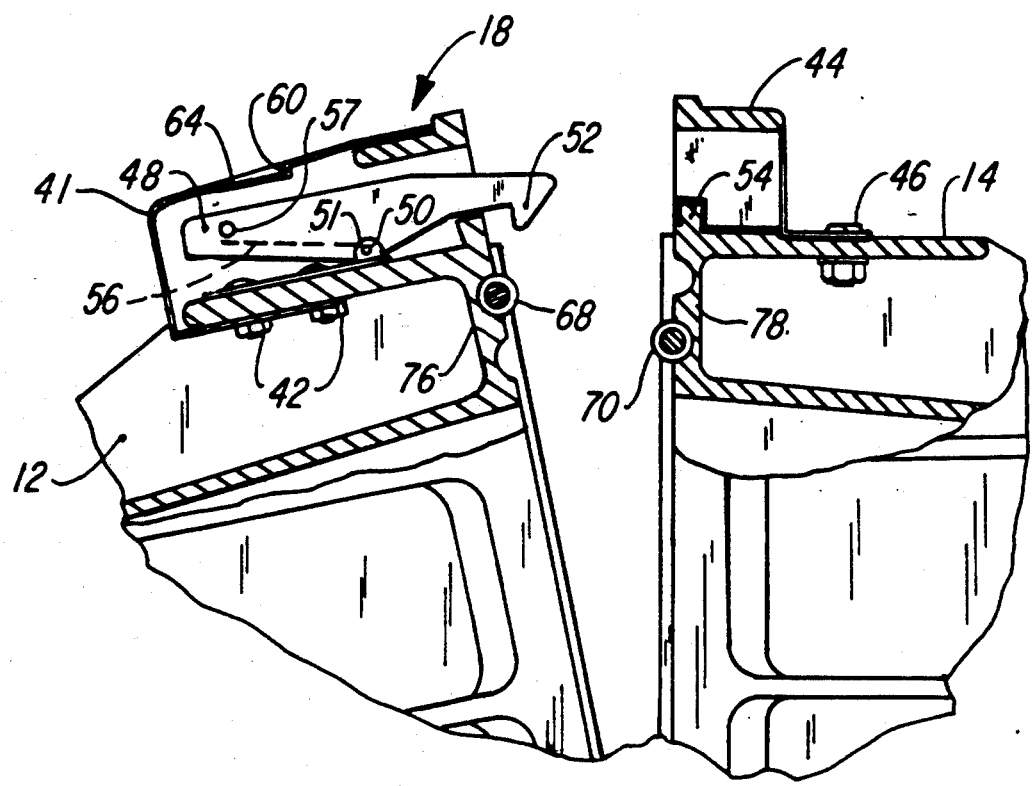
FIGS. 5 and 6 are views of a portion of the cassette in partial section showing the cassette latch in unlatched and latched positions respectively.
Figure 6:
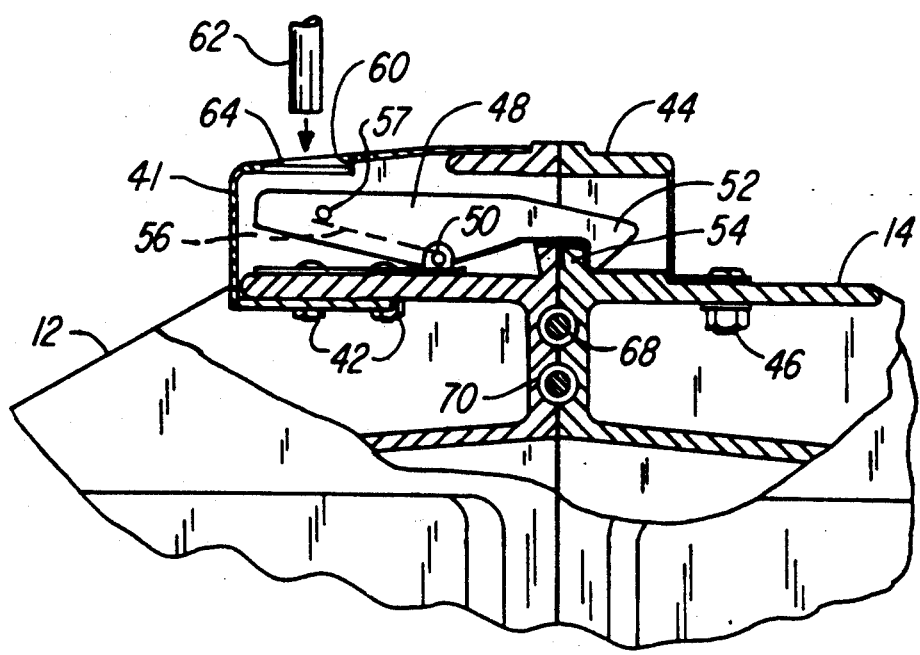

Referring now to FIGS. 5 and 6 of the drawings, the latch 18 comprises a rectangular two part housing extending across the clam shell interface on the upper end of the cassette. The housing prevents accidental actuation of the latch arm described below. One housing portion 41 is attached to the clam shell half 12 by bolts 42 and the other housing portion 44 is attached to clam shell half 14 by bolt 46. A latch arm 48 pivotally supported by a pin 50 is positioned within the housing portion 41. The pin 50 is mounted in a bracket 51 and also attached to the clam shell half 12 by bolts 42. The latch arm 48 has a hook portion 52 adapted to be received within the housing portion 44 when the clam shell halves are closed to engage an abutment 54 on the clam shell half 14. The latch arm 48 is biased for pivotal clockwise movement by a leaf spring 56 having one arm attached to clam shell half 12 by bolts 42 and its other arm engaging a pin 57 on the arm 48. When the clam shell halves are open, the parts will be in the positions shown in FIG. 5. As the clam shell halves close, the hook portion 52 will move over the abutment 54 and assume the latched position shown in FIG. 6 under the bias of the spring 56.

As will be apparent from FIG. 1, the latch housing is not symmetrical with the half shells interface axis. This feature provides a space or notch on the right end of the latch housing, as viewed in FIG. 1, which can be detected by sensing equipment to determine whether the cassette is properly oriented or it can be used to prevent wrong way insertion in a nest having complemental non-symmetrical surfaces.

An opening 60 is provided in the upper wall of housing portion 41 to permit insertion of a tool or shaft 62 to engage and release the latch arm 48. The opening 60 is covered with a frangible material 64, such as paper, attached to the housing portion 41 by a suitable adhesive. The material 64 may be attached to the housing upon inserting the film roll into the cassette. The presence of the material 64 in an unbroken state will indicate to a worker that the cassette has not been opened subsequent to loading the film roll. If the material 64 is torn, that condition will warn the operator that the cassette may have been opened and that the film may have been damaged by exposure to white light. The material 64 has particular utility in that it permits a worker to determine its condition by touch in dark room conditions.

Figure 12:
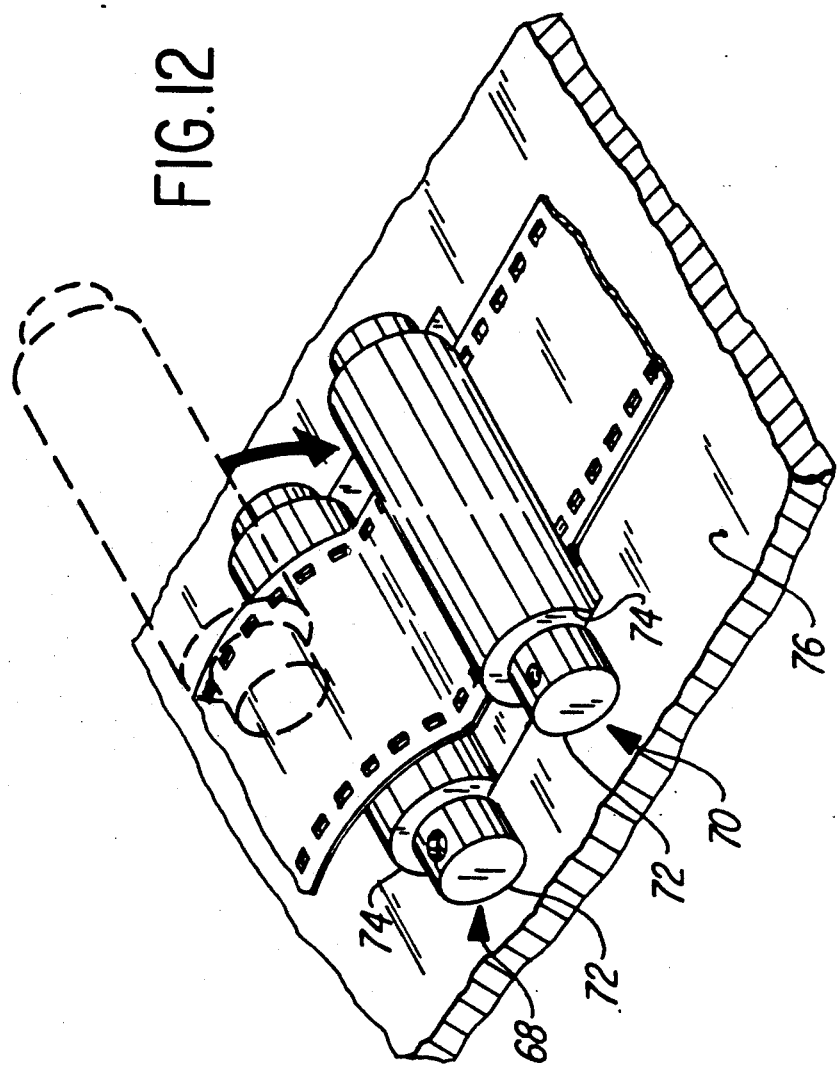
FIG. 12 is a perspective view illustrating the cassette film clamping and light sealing means.

Positioned on the clam shell halves below the latch means 18 is a means for clamping the film and sealing the cassette if it is necessary to close the cassette prior to removal of the entire film strip on the core. Such a need may arise if there is a failure of the finishing equipment to which the film is being transported. Referring to FIGS. 5, 6, and 12, this means comprises a pair of rolls 68 and 70. Each roll comprises an elongated shaft 72 and a compliant sleeve 74 fitted over the shaft (FIG. 12). Each sleeve 74 has a length greater than the width of the film and each shaft 72 has a length greater than that of the sleeve to thus extend from each end of the sleeve as shown in FIG. 12. One half of the roll 68 is fixed within a half cylindrical recess in the face surface of wall 76 of clam shell half 12. Similarly, one half of roll 70 is fixed within a half cylindrical recess in wall 78 of clam shell half 14, as shown most clearly in FIG. 5. When the clam shell halves are closed, the other half of each roll will be received by a half cylindrical recess in the other clam shell, as shown in FIG. 6. If the cassette is closed, the exiting film strip will be clamped between the two walls 76 and 78 with the rolls forcing the film into a serpentine configuration as shown in FIG. 12. This serpentine configuration provides secure clamping of the film and a labyrinth light seal along the longitudinal axis of the film.

The film clamping means comprising roll 68 and 70 allow the cassette clam shell halves to close on a threaded-up film roll in a film unwind enclosure while preventing loss of inter-roll tension. An operator can then open the enclosure and access it in room light conditions. If a cassette with a partially used roll is then removed from the unwind enclosure, the film would be cut by the operator with the free end left exposed and clamped by the compliant rolls 68 and 70 in the clam shell interface. During such removal and transport of the cassette, the "core brake" provided by the core cassette interface will prevent rotation of the film roll to thereby prevent loss of inter-roll film tension. The clamped free end and clamped core combination thus allows transport of cassettes containing partially used rolls without clockspringing of the roll. If a partially used roll is reused, the end would be reconfigured and reshaped, as shown in FIG. 13, in a dark area.

During the transport of a cassette with a full roll of film, the rolls 68 and 70 and associated recesses also function as a third light blocking means for blocking light in a direction parallel to the longitudinal axis of the interfacing surfaces of the half shells. This means, in combination with the first and second light blocking means described above, insures that the cassette will be totally light sealed. In fact, tests have shown that the ends of the cassette clam shell halves can be opened at the latch end 3/16 inch for two weeks without damaging the film.

It will now be apparent that a cassette in accordance with the invention possesses many advantages and facilitates the transport and removal of light sensitive material such as photographic film. It will also be apparent that many features of the cassette have utility in cassettes for non-light sensitive materials.

Those skilled in the art to which the invention relates will appreciate that various substitutions and modifications can be made to the described embodiment without departing from the spirit and scope of the invention as described by the claims below.

What is claimed is:

1. A cassette for containing a roll of web material comprising:
    first and second cassette parts having open and closed conditions adapted to engage each other in said closed condition of the cassette, said first and second cassette parts defining a generally central circular opening when in engagement with each other; and
    a circular core for supporting a roll of web material for reception within said opening, said first and second parts frictionally engaging and clamping said core in the closed condition of the cassette to present rotation of said core relative to said cassette parts.

2. A cassette as claimed in claim 1 wherein said core has an annular surface for supporting the roll and an annular light barrier surface on each side of said roll supporting surface, said first and second cassette parts having light barrier surfaces which mate with said light barrier surfaces of said core.

3. A cassette as claimed in claim 2 wherein said light barrier surfaces on said core comprise annular recesses and said light barrier surfaces on said first and second parts comprise annular ribs adapted to mate with said annular recesses.

4. A cassette as claimed in claim 3 further including a ring of compliant material positioned in each of said recesses to be engaged by said ribs.

5. A cassette as claimed in claim 4, wherein each of said rings has a generally circular cross section with equally radially spaced longitudinal wings extending therefrom.

6. A cassette as claimed in claim 5, wherein there are at least four of said wings.

7. A cassette for containing a roll of web material comprising:
    first and second cassette parts having interfacing surfaces respectively for engaging each other in a closed position of said cassette parts;
    hinge means for coupling the ends of said first and second parts;
    latch means for releasibly coupling the ends of said cassette parts opposite from said hinge means, said latch means being releasible to permit relative displacement of said first and second parts from said closed position to an open position;
    means for supporting a web roll within the cassette; and
    resilient means supported by said interfacing surfaces for securely clamping the web between said interfacing surfaces in said closed position of said first and second parts to prevent removal of the web from the cassette during handling of the cassette.

8. A cassette a claimed in claim 7 wherein said first and second cassette parts have juxtaposed semicircular recesses which define a circular recess in the closed position of said parts and wherein said roll supporting means comprises a circular core positioned in said circular recess, said core being frictionally constrained against rotation by said cassette parts when said parts are in their closed position.

9. A cassette as claimed in claim 7 or 8 wherein said resilient means forces said web into a serpentine path in the closed position of said first and second parts.

10. A cassette as claimed in claim 9 further including a pair of half cylindrical recesses in each of said interfacing surfaces respectively, said resilient means comprising a cylindrical roll having a compliant surface fixed within one of said recesses of each of said interfacing surfaces, the roll in each interfacing surface being received in one of said half cylindrical recesses in the opposing interfacing surface of the other part in the closed position of said parts.

11. A cassette as claimed in claim 8 wherein the roll of web material is light sensitive material and said core and said cassette parts have interfacing light blocking surfaces.

12. A cassette as claimed in claim 11 wherein said interfacing light blocking surfaces comprise annular recesses in said core and annular ridges on said semicircular recesses.

13. A cassette as claimed in claim 12 further including a ring of compliant material in each of said recesses in said core to increase the rotational frictional constraint of said core by said cassette parts.

14. A cassette for containing a roll of light sensitive web material comprising:
    first and second cassette parts having open and closed conditions and adapted to engage each other in said closed condition of said parts, said first and second cassette parts defining a circular opening when in engagement with each other; and
    a circular core for supporting a roll of web material for reception within said opening, said first and second parts frictionally engaging sand clamping said core in their closed condition to prevent rotation of said core;
    first elongated surfaces defining a longitudinal axis on said cassette parts respectively for engaging each other in the closed condition of said cassette;
    first light blocking means on said surfaces for blocking light in a direction transverse to said longitudinal axis; and
    second light blocking means on said surfaces adjacent said core for blocking light in directions both transverse and parallel to said longitudinal axis.

15. A cassette as claimed in claim 14 further comprising:
    releasible latch means on the ends of said cassette parts at the end of said surfaces for latching said parts together; and
    third light blocking means for blocking light in a direction parallel to said longitudinal axis.

16. A cassette as claimed in claim 14 or 15 wherein said first light blocking means comprises a plurality of parallel ribs and grooves on said surfaces which mate in the closed condition of the cassette.

17. A cassette as claimed in claim 16 wherein said second light blocking means comprises a second plurality of ribs and grooves on said surfaces, some of said second plurality of ribs and grooves having light blocking portions extending parallel to said longitudinal axis and others of said second plurality of ribs and grooves having light blocking portions extending transversely of said longitudinal axis, said second plurality of ribs and grooves being arranged to mate in the closed condition of the cassette to provide light blocking.

18. A cassette as claimed in claim 15 wherein said third light blocking means comprises:
    at least one cylindrical member extending transversely of said longitudinal axis and having a compliant surface; and
    a pair of juxtaposed half cylindrical recesses in said elongated surfaces respectively, said member being fixed within the recesses of one of said elongated surfaces and received in the recess of the other of said elongated surfaces in the closed condition of said cassette.

19. A cassette as claimed in claim 18 wherein said third light blocking means further comprises:
    a second pair of juxtaposed half cylindrical recesses in said surfaces in spaced parallel relationship with the first said recesses; and
    a second cylindrical member having a compliant surface fixed in the recess of said second pair in said other elongated surface and received in the opposing recess of said one elongated surface in the closed condition of the cassette.

20. A cassette as claimed in claim 18 wherein film exits the cassette between said elongated surfaces in the open condition of said cassette, said member serving to clamp the film between said compliant member and the surface of said other recess in the closed condition of the cassette.

21. A cassette as claimed in claim 19 wherein film exits the cassette between said elongated surfaces in the open condition of the cassette, said cylindrical members serving to clamp the film in a serpentine path in the closed condition of the cassette.

22. A cassette for housing a roll of light sensitive web material, said cassette comprising:
    identical first and second molded cassette parts defining a central opening in a closed condition, said parts having surfaces on opposite sides of said opening adapted to engage with each other in the closed condition of said cassette; and
    light blocking means on each of said surfaces, said light blocking means comprising a plurality of ribs and grooves on each of said surfaces and wherein each of said parts has the ribs on one side of said opening aligned with grooves on the other side of said opening whereby when the parts are rotated 180 degrees, the ribs on one of said parts will mesh with the grooves on the other of said parts.

* * * * *